United States Patent [19]

DeHoff et al.

[11] Patent Number: 4,808,979
[45] Date of Patent: Feb. 28, 1989

[54] CURSOR FOR USE IN 3-D IMAGING SYSTEMS

[75] Inventors: Richard J. DeHoff; Peter W. Hildebrandt, both of Beaverton, Oreg.

[73] Assignee: Tektronix, Inc., Beaverton, Oreg.

[21] Appl. No.: 33,291

[22] Filed: Apr. 2, 1987

[51] Int. Cl.$^4$ ............................................. H04N 13/00
[52] U.S. Cl. ........................................ 340/709; 358/88
[58] Field of Search ............... 340/705, 709, 723, 724, 340/747, 706; 358/88, 89, 90, 91, 92; 350/133, 131, 132

[56] References Cited

U.S. PATENT DOCUMENTS

| | | | |
|---|---|---|---|
| 4,214,267 | 7/1980 | Roese et al. | 358/92 |
| 4,259,725 | 3/1981 | Andrews et al. | 340/724 |
| 4,562,463 | 12/1985 | Lipton | 358/88 |
| 4,663,616 | 5/1987 | Himelstein | 340/747 |
| 4,719,507 | 1/1988 | Bos | 358/88 |

Primary Examiner—John W. Caldwell, Sr.
Assistant Examiner—Alvin Oberley
Attorney, Agent, or Firm—Paul S. Angello; John D. Winkelman

[57] ABSTRACT

The present invention constitutes a cursor image (36) for use in graphics imaging systems for providing images with three-dimensional qualities. The cursor indicates position within a three-dimensional space. The cursor comprises a reference symbol (38) located at a reference point (58) on a reference plane (60), a pointer symbol (40) located pointing to the position (42), and a tether symbol (44) connecting the reference symbol and the pointer symbol. The cursor image includes depth cue features which assist the observer in gauging the depth of the position being indicated. The cursor is preferably displayed with a stereoscopic imaging system (10) employing a liquid crystal stereo switch unit (16). In such a system the cursor image is displayed on a cathode-ray tube (12) in left and right perspective projections (46) and (48) of differing binocular disparity which are used by the observer to form a single three-dimensioinal image of the cursor.

16 Claims, 3 Drawing Sheets

CURSOR FOR USE IN 3-D IMAGING SYSTEMS

TECHNICAL FIELD

The present invention relates to three-dimensional imaging systems and more particularly to techniques for indicating position within graphics images having three-dimensional qualities.

BACKGROUND OF THE INVENTION

A number of different systems exist for generating graphic images which may be described as three-dimensional. These systems convert data corresponding to three-dimensional images to data corresponding to two-dimensional images including depth cues such as shading, perspective, or hidden line removal. These depth cues provide three-dimensional qualities to the two-dimensional images being displayed. Very effective three-dimensional qualities can also be provided with stereoscopic displays which use binocular disparity as their primary depth cue.

In all of these systems, it is frequently desirable to provide a cursor for indicating particular positions within the images displayed. Cursors consisting of very simple constructs such as cross marks have typically been used. These constructs provide very limited depth information. Consequently, observers of the displays have often found it difficult to properly register the position of a cursor within a three-dimensional image.

SUMMARY OF THE INVENTION

It is an object of the present invention to provide a cursor for use in a three-dimensional imaging system which allows an observer to quickly and accurately register the position of the cursor within the image.

It is a further object of the present invention to provide in a stereoscopic display system a cursor which is of simple construction but readily and positively indicates position in a stereoscopic image.

The present invention constitutes a cursor image comprising a reference symbol, a pointer symbol, and a tether symbol interconnecting the reference and pointer symbols. The reference symbol is composed of a simple construct of limited dimensions such as a small Greek cross (i.e. a "+"). The reference symbol is located at a reference point on a standard reference plane such as the zero disparity plane in a stereoscopic system. The pointer symbol is composed of a different construct of limited dimensions such as a Saint Andrew's cross (i.e. a "x"). The pointer symbol is located pointing to the position which is being indicated. The tether symbol comprises a simple construct such as a line interconnecting the reference symbol and pointer symbol. The cursor includes depth cue features which vary continuously along its length.

In the preferred embodiment, the cursor described above is used in a stereoscopic imaging system which employs a liquid crystal stereo switch to provide a field sequential stereosopic display. In this system, two different two-dimensional perspective projections of the cursor are displayed to the left and right eyes of an observer who fuses the projections to form a single three-dimensional image of the cursor. As a depth cue, the two-dimensional perspective projections of the cursor exhibit varying binocular disparity along their lengths. The greatest disparity occurs at the pointer symbols. The reference symbols are located on the zero disparity plane, thereby allowing the position of cursor to be easily gauged. In the preferred embodiment, the reference symbol is at the zero disparity depth which is also at the plane of the display screen, i.e., the focal plane, which makes the cursor easy to register, understand, and view.

DESCRIPTION OF THE PREFERRED EMBODIMENT

Figure 1:
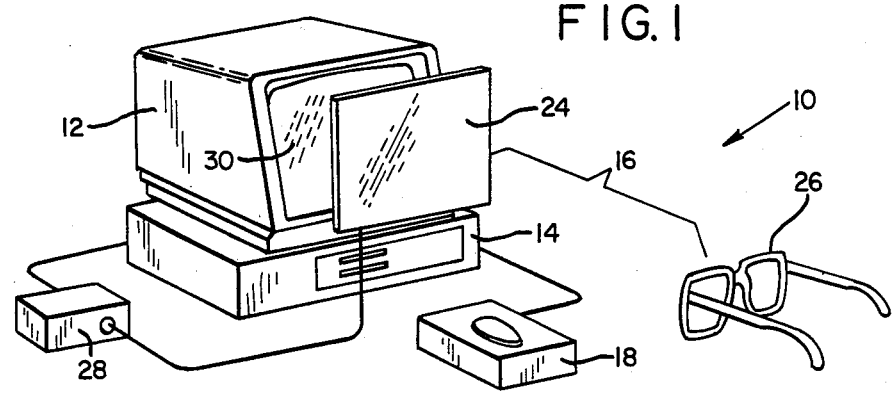
FIG. 1 is a diagrammatic view of a preferred graphics imaging system for use in displaying the present invention.

Referring now to FIG. 1, the stereoscopic display system 10 comprises a display device, such as a cathode-ray tube 12, for displaying two-dimensional images, a computer 14 having graphics display capabilities, a liquid crystal stereo switch unit 16, and a conventional track ball device 18. The display device 12 is a RGB color monitor with a 48 centimeter display screen. The computer 14 constitutes a PC AT manufactured by International Business Machines, Inc., and includes a special graphics card. The graphics card comprises two image frame buffers for separately storing display images and associated circuitry for alternately supplying image information to the display device 12 from each of the two different frame buffers at a 120 Hz rate. The computer 14 also includes software for operating on a database of three-dimensional information to produce two complementary perspective views as required for a stereoscopic display. The liquid crystal stereo display switch unit 16 includes the liquid crystal encoder module 24 and a set of polarized eyeglasses 26. The encoder module 24 operates in response to signals from the controller 28 to separately encode alternate light images from the display screen 30 of the cathode-ray tube 12 in left-and right-circularly polarized light. The polarized eyeglasses 26 decode the light emanating from the encoder module 24 and include right and left lenses each of which is adapted to exclusively transmit light of a particular polarization sense. The track ball 18 operates to provide signals to the computer 14 to control the position of a cursor produced in accordance with the present invention and to allow different positions to be selected for indication by a cursor.

In operation, the system 10 generates a stereoscopic image display providing a perception of depth to an observer wearing the eyeglasses 26. The computer 14 calculates two different two-dimensional perspective projections of each scene intended to be displayed. The two-dimensional perspective projections correspond to the left and right eye views of the scene for an observer of the display. The views are calculated by the software 22 through the use of well-known algorithms which convert three-dimensional image data into complementary two-dimensional perspective projections having binocular disparity between them. The two perspective projections correlate to the differences in viewing angle between the right and left eyes of an observer at a predetermined viewing distance from the images in the display scene. The information for each of the perspective projections is separately written into one of the two frame buffers on the graphics card. The graphics card alternately supplies the information corresponding to each perspective projection from the frame buffers to the cathode-ray tube 12. The cathode-ray tube 12 alternately displays the two perspective projections.

The graphics card 20 also generates signals indicative of which perspective projection is being supplied to the cathode-ray tube 12. These signals are received by the controller 28 which provides oscillating voltage signals to the encoder module 24 for driving the liquid crystal stereo switch unit 16 in synchrony with the alternating perspective projections displayed on the cathode-ray tube 12. The encoder module 24 encodes right perspective projections in right-circularly polarized light and encodes left perspective projections in left-circularly polarized light. The right and left lenses of the eyeglasses 26 decode light with respect to its polarization sense. The lenses allow only right-circularly polarized incident light to the right eye of the observer and only left-circularly polarized incident light to the left eye of the observer. The display system thereby provides a stereoscopic display having three-dimensional qualities by supplying different perspective projections of differing binocular disparity to each eye of the observer.

Figure 2:
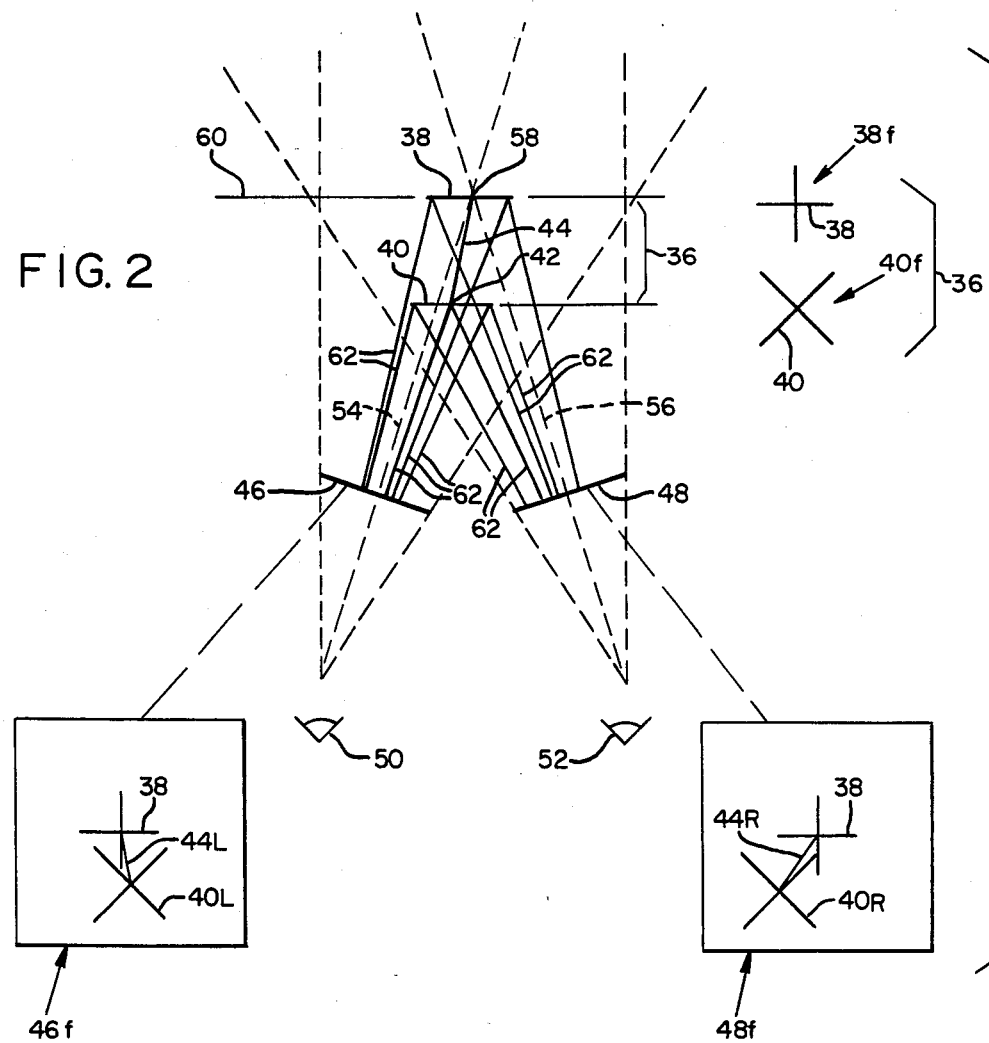
FIG. 2 is a plan view, together with enlarged frontal views of certain features, of the preferred embodiment of the present invention as it might be calculated by the stereoscopic imaging system of FIG. 1.

FIG. 2 shows a three-dimensional space containing the three-dimensional cursor 36 of the preferred embodiment as viewed from above. The cursor 36 comprises a reference symbol 38 in the form of a Greek cross, a pointer symbol 40 in the form of a St. Andrew's cross and located at the point of indication 42, and a tether symbol 44 in the form of a line connecting the centers of the reference symbol 38 and the pointer symbol 40. The point of indication 42 represents an observer's perceived position of the cursor 36. FIG. 2 shows enlarged frontal elevation views 38$f$ and 40$f$ of the reference symbol 38 and the cursor symbol 40, respectively, as would be perceived by the observer.

Two two-dimensional projections 46 and 48 are taken from the three-dimensional cursor 36, one for the left eye 50 and one for the right eye 52. FIG. 2 also shows enlarged frontal elevation views 46$f$ and 48$f$ of the two-dimensional projections 46 and 48, respectively. In this embodiment, the plane of the left eye projection 46 and the plane of the right eye projection 48 are positioned such that the line-of-sight 54 of left eye 50 pierces the center of the left eye projection plane 46 and the line-of-sight 56 of right eye 52 pierces the center of the right eye projection plane 48. In this embodiment, the projection planes 46 and 48 are also positioned such that the two lines-of-sight 54 and 56 converge at the center of the reference symbol 38 of the three-dimensional cursor 36 forming the lines-of-sight convergence point 58. The lines-of-sight convergence point 58 defines the zero disparity plane 60. The intersections of projection lines 62 on the projections 46 and 48 show the increasing amount of disparity as a function of distance from the zero disparity plane 60.

The cursor 36 includes depth cues which continuously vary along the length of tether symbol 44 and allow the observer to properly register the position of the cursor within the three-dimensional space. In the present case, these depth cues constitute the binocular disparity between the left perspective projection 46 and the right perspective projection 48 of the cursor 36. The left perspective projection 46 comprises the reference symbol 38, the tether symbol 44L, and the pointer symbol 40L. The right perspective projection 48 comprises the reference symbol 38, the tether symbol 44R, and the pointer symbol 40R. The left perspective projection 46 and the right perspective projection 48 are alternately displayed on the cathode-ray tube 12 and are perceived by the observer as a single image of the cursor 36 having a three-dimensional quality.

The cursor 36 is especially useful in stereoscopic displays because the reference symbol can be located on the zero disparity plane 60, which constitutes, therefore, a reference plane with zero binocular disparity. Consequently, the locations of the reference symbol 38 in the two perspective projections will exactly coincide (i.e., there would be no binocular disparity in the two perspective projections of the reference symbol 38 as is shown in FIG. 2). The right and left perspective projections of the cursor 36 occupy the same locations when the cursor is indicating a position on the reference plane 60. This arrangement is advantageous because an observer focuses on the same plane where the two images merge, thereby making it easier for the observer to discern the zero disparity plane. The left perspective projection would be positioned to the left of the right perspective projection when the cursor indicates a position in back of the reference plane 60. The left perspective projection would be positioned to the right of the right perspective projection when the cursor indicates a position forward of the reference plane 60. Whenever the cursor indicates a position beyond the reference plane 60, the binocular disparity of the perspective projections 46 and 48 varies continuously to reach a maximum at the pointer symbols 40L and 40R which allows the depth of the position indicated by the cursor 36 to be accurately gauged.

Figure 3:
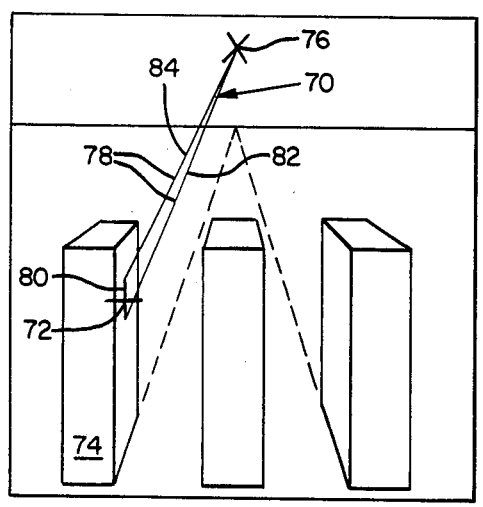
FIG. 3 is a diagram of an alternative embodiment of the present invention.

Referring now to FIG. 3, an alternate form of cursor 70 is illustrated in an imaging system employing a different type of depth cue. The cursor 70 is indicating a position 72 on the rectangular column 74. The cursor 70 comprises the reference symbol 76, the tether symbol 78, and the pointer symbol 80. In this case, the reference symbol 76 is centrally placed at an elevated reference point on a distant reference plane. The pointer symbol 80 is located in proximity to the position 72 being indicated The tether 78 includes two lines 82 and 84 which are drawn in perspective and which thereby provide a cue for gauging the depth of the position 72 being indicated.

Figure 4:
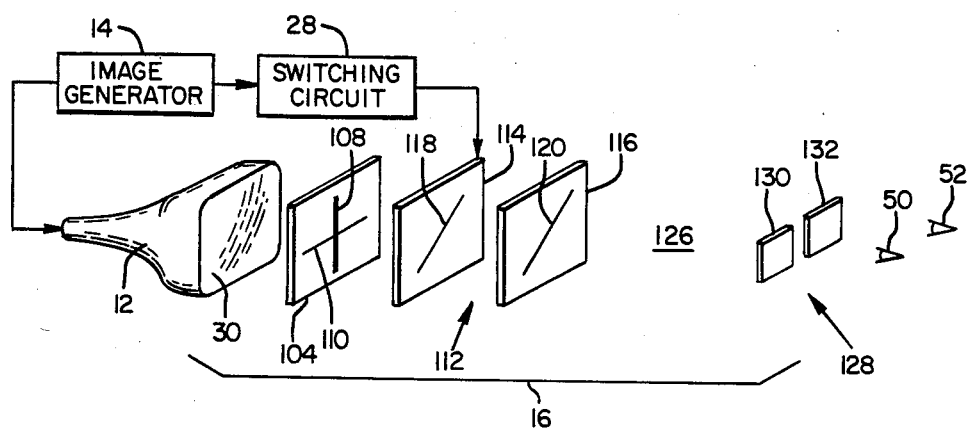
FIG. 4 is a detailed diagram of the optical components of the stereoscopic imaging system of FIG. 1.

Referring now to FIG. 4, a detailed diagram of a preferred embodiment of a liquid crystal stereo switch unit 16 with which the cursor of the present invention may be employed is shown. The cathode-ray tube 12 produces, as previously explained, in alternate sequence first and second perspective projections of a scene. A first polarizing filter 104 of the switch unit 16 is disposed face-to-face with the screen 30 of the cathode-ray tube 12 and polarizes in a predetermined polarization state the light rays that emanate from the screen 30. The polarizing filter 104 is a neutral linear polarizer with a vertical absorption axis 108 and a horizontal transmission axis 110.

The light rays carrying the first and second perspective projections exit the polarizing filter 104 through its transmission axis 110 and strike a variable optical retarding means 112 comprising a variable optical retarder 114 and a quarter-wave plate 116 that are positioned face-to-face. The optic axis 118 of the variable optical retarder 114 and the optic axis 120 of the quarter-wave plate 116 are parallel to each other and are disposed at substantially 45° angles with respect to the polarization axes 108 and 110 of the polarizing filter 104.

An image generating device 14 such as a graphics computer delivers to cathode-ray tube 12 image information corresponding to the first and second perspective projections of the scene and provides signals to a switching circuit 28, such as a controller, in synchronism with the delivery of such information as previously explained. The switching circuit 28 provides switching signals to the variable retarders 114, which develops in response to the switching signals either essentially zero retardation in the "ON" state or substantially half-wave retardation in the "OFF" state.

Whenever the light rays carrying the first perspective projection exit the horizontal transmission axis 110 of the polarizing filter 104, the switching circuit 28 applies a signal to command the variable retarder 114 to develop essentially zero retardation (i.e., the "ON" state). The quarter-wave plate 116 develops substantially quarter-wave retardation of the light rays passing through it. Under these conditions, the light rays of the first perspective projection image exiting the quarter-wave plate 116 are left-circularly polarized.

Whenever the light rays carrying the second perspective projection exit the horizontal transmission axis 110 of the polarizing filter 104, the switching circuit 28 applies a signal to command the variable retarder 114 to develop substantially half-wave retardation (i.e., the "OFF" state). The quarter-wave plate 116 develops substantially quarter-wave retardation of the light rays passing through it. Under these conditions, the light rays of the second perspective projection exiting the quarter-wave plate 116 are right-circularly polarized.

The polarizing filter 104 and the variable optical retarding means 112 constitute an image encoding means that encodes the first perspective projection in light of a first polarization sense (i.e., left circular polarization) and the second perspective projection in light of a second polarization sense (i.e., right circular polarization). The light rays exiting the variable optical retarding means 112 propagate through a transmission medium 126, such as air, and strike an image decoding means 128 which form the eyepieces for glasses that are worn by an observer. The image decoding means 128 presents the first and second perspective projections to the observer's left eye 50 and right eye 52, respectively.

The image decoding means 128 comprises a first viewing means 130 and a second viewing means 132. The first viewing means 130 is positioned in front of the observer's left eye 50 and comprises a left circular polarizing decoder. The second viewing means 132 is positioned in front of the observer's right eye 52 and comprises a right circular polarizing decoder.

Whenever the variable retarder 114 is commanded to produce essentially zero retardation, the left-circularly polarized light rays of the first perspective projection strike the decoders 130 and 132 The decoder 130 transmits the left-circularly polarized light rays to the observer's left eye 50, and the decoder 132 blocks the left-circularly polarized light rays from the observer's right eye 52. Light rays of the first perspective projection are, therefore, transmitted to the observer's left eye 50 and blocked from the observer's right eye 52.

Whenever the variable retarder 114 is commanded to produce substantially half-wave retardation, the right-circularly polarized light rays of the second perspective projection strike the decoders 130 and 132. The decoder 130 blocks the riqht-circularly polarized light rays from the observer's left eye 50, and the decoder 132 transmits the right-circularly polarized light rays to the observer's right eye 52. Light rays of the second perspective projection are, therefore, blocked from the observer's left eye 50 and transmitted to the observer's right eye 52.

It will be appreciated that since the viewing means or decoders 130 and 132 constitute first and second eyepieces positioned alongside of each other in the form of viewing glasses to be worn by an observer, the circular polarization decreases the image contrast sensitivity that results from head tilt motion by the observer.

The preferred embodiment of the liquid crustal stereoscopic switch with which the present invention is employed incorporates a liquid crystal cell operating as variable optical retarder that controls the retardation of light passing therethrough in response to the intensities of electric fields produced by excitation voltages applied to the cell electrode structures. The liquid crystal cell is capable of switching between optical retardation states in relatively short transition times.

Figure 5:
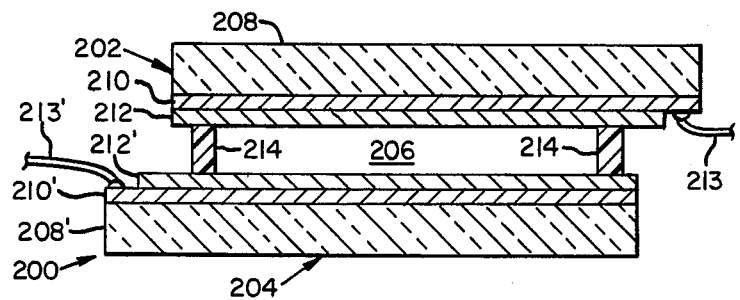
FIG. 5 is a cross sectional view of the liquid crystal cell that is used as a variable optical retarder in the optical components of the imaging system shown in FIG. 4.

Referring now to FIG. 5, a liquid crystal cell 200 includes a pair of generally parallel, spaced-apart electrode structures 202 and 204 with nematic liquid crystal material 206 included therebetween. The electrode structure 202 comprises a glass dielectric substrate 208 that has on its inner surface a layer 210 of electrically conducting, but optically transparent, material such as indium tin oxide. A director alignment film layer 212 is applied to the conductive layer 210 and forms a boundary between the electrode structure 202 and the liquid crystal material 206. The surface of the film 212 which contacts the liquid crystal material is conditioned in accordance with one of two preferred methods to promote a desired orientation of the directors of the liquid crystal material in contact therewith. The materials constituting and the corresponding methods of conditioning the director alignment film 212 are described in detail hereinbelow. The electrode structure 204 is of a construction similar to that of the electrode structure 202, and the components corresponding to those of electrode structure 204 are shown with identical reference numerals followed by primes.

The short length edges of the electrode structures 202 and 204 are offset relative to each other to provide access to the conductive layers 210 and 210' for connecting at terminals 213 and 213, the output conductors of the switching circuit 28. Spacers 214 may be comprised of any suitable passive material such as glass fiber to preserve the general parallel relation between the electrode structures 202 and 204.

Figure 6A:
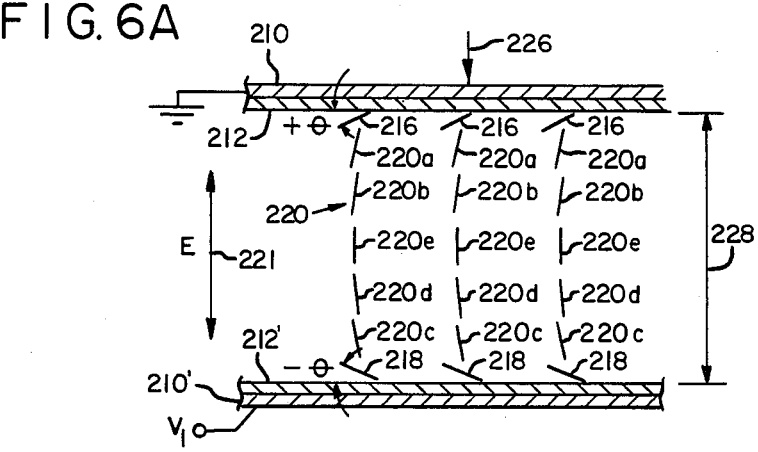
FIGS. 6A and 6B are schematic diagrams of the director alignment configurations of the liquid crystal cell of FIG. 5 which is used as an optical retarder.
Figure 6B:
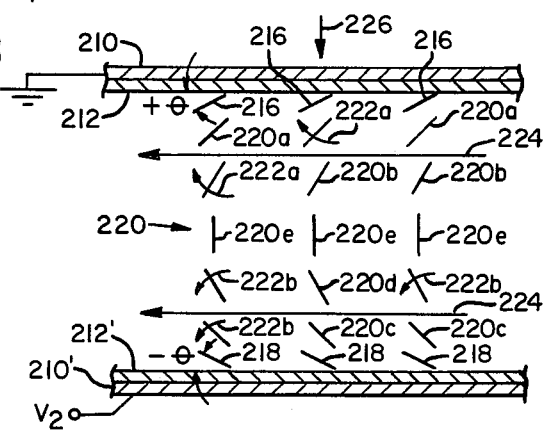

Referring now to FIGS. 6A and 6B, the film layer 212 of the electrode structure 202 is conditioned so that the electrode structure surface contacting directors 216 are aligned parallel to each other at a tilt bias angle $\theta$, which is measured in the counterclockwise sense with reference to the surface of the film layer 212. The film layer 212' of the electrode structure 204 is conditioned so that the electrode structure surface contacting directors 218 are aligned parallel to each other at a tilt bias angle $-\theta$, which is measured in the clockwise sense with reference to the surface of the film layer 212'. Thus, the liquid crystal cell 200 is fabricated so that the surface contacting directors 216 and 218 of the opposed surfaces of the director alignment layers 212 and 212' of the electrode structures 202 and 204, respectively, are tilt-biased in opposite directions.

A first preferred method of effecting the desired alignment of the surface contacting directors entails the use of polyimide as the material that comprises the alignment film layers 212 and 212' on the electrode structures 202 and 204, respectively. Each alignment film layer is rubbed to produce a tilt bias angle $|\theta|$, with 2° to 5° being the preferred range. A second preferred method of effecting the desired alignment of the surface contacting directors entails the use of silicon monoxide as the material which comprises the alignment film layers 212 and 212' of the electrode structures 202 and 204, respectively. The silicon monoxide layer is evaporated and vapor deposited preferably at a 5° angle measured from the electrode structure surface in an amount sufficient to produce a tilt bias angle $|\theta|$ of between 10° to 30°, with 15° to 25° being the preferred range.

It will be appreciated that methods for depositing silicon monoxide or other alignment materials to align liquid crystal molecules in a predetermined direction are conventional in nature and are well known to those having ordinary skill in the art.

FIG. 6A depicts the orientation of the surface noncontacting directors 220 when an AC signal $V_1$ of approximately 2 KHz and 20 Vrms is applied to the conductive layers 210 and 210' of the electrode structures 202 and 204, respectively. The signal $V_1$ on the conductive layer 210' with the conductive layer 210 grounded constitutes a first switching state produced at the output of the switching circuit 28 and produces an alternating electric field, E, between the electrode structures 202 and 204 within the liquid crystal cell 200 to force the cell into its "ON" optical retardation state. A substantial number of the surface noncontacting directors 220 of a liquid crystal material 206 that has a positive anisotropy value align essentially end-to-end along the direction 21 of the electric field flux lines within the cell, which direction is normal to the conditioned surfaces of the electrode structures. Thus, when the cell 200 is excited into its "ON" state, the surface noncontacting directors 220 are aligned perpendicularly to the surfaces of the cell.

FIG. 6B depicts the orientation of the surface noncontacting directors 220 after the signal $V_1$ is removed so that the alignment of the surface noncontacting directors is influenced not by an electric field produced between the electrode structures 202 and 204 within the cell, but by the intermolecular elastic forces which cause relaxation of the surface noncontacting directors from the end-to-end alignment of the "ON" state. The removal of the signal $V_1$ constitutes a second switching state produced at the output of switching circuit 28. The director orientiation shown in FIG. 6B corresponds to that of the "OFF" optical retardation state of the cell.

Switching the cell 200 to the "OFF" state can also be accomplished by applying to the layer 210' of the cell an AC signal $V_2$ produced at the output of the switching circuit 28 having a voltage level which is less than that of the signal $V_1$ and generally near 0 V. The frequency of signal $V_2$ is generally the same as that of signal $V_1$.

The method of operating the liquid crystal cell 200 as a variable optical retarder is directed to the disclination-free surface noncontacting director relaxation from the electric field aligned or "ON" state depicted by FIG. 6A to the planar configuration or "OFF" state depicted by FIG. 6B. In the present case, the liquid crystal cell 200 is operated as a zero to half-wave retarder whose optic axis corresponds to the alignment direction of the surface noncontacting directors 220.

Linearly polarized light which propagates in the direction 226 normal to the surfaces of the electrode structures 202 and 204 is coincident with the direction of surface noncontacting directors 220 when the liquid crystal cell is in the "ON" state. The directors 220 are oriented in such "ON" state so that there is a negligible projection of the optic axis on the electrode structure surfaces of the cell. Under these conditions, the liquid crystal cell 200 produces substantially reduced optical retardation for incident light propagating in the direction 226.

Linearly polarized light which propagates in the direction 226 normal to the surfaces of the electrode structures 202 and 204 is noncoincident with the alignment direction of the surface noncontacting directors when the liquid crystal cell is in the "OFF" state. The directors 220 are oriented in such "OFF" state so that each one of a substantial number of them projects a component on the electrode structure surfaces of the cell. Under these conditions, the liquid crystal cell 200 has an effective birefringence for generally normally incident light.

In switch unit 16 of FIG. 4, the orientation of the surface noncontacting directors 220 of the variable optical retarders 114 and 116 provides essentially half-wave optical retardation for light of the wavelength which satisfies the mathematical expression:

$$\Delta nd/\lambda = \tfrac{1}{2}$$

where d represents the thickness 228 and $\Delta n$ represents the effective birefringence of the cell.

As may be apparent to those having skill in the art, many changes may be made in the above-described details of the preferred embodiments of the present invention without departing from the underlying principles thereof. The scope of the present invention should be determined, therefore, only by the following claims.

We claim:

1. A cursor for indicating position within a three-dimensional space on a display device in a graphics imaging system, said cursor comprising:
   an image on said display device, said image extending from a reference point on a reference plane to a particular position being indicated and having one or more depth cue features, said image including:
   a reference symbol located at said reference point on said reference plane;
   a pointer symbol located pointing to said particular position; and
   a tether symbol connecting said reference symbol and said pointer symbol,
   whereby said depth due features vary along the length of said tether symbol and allow an observer to register properly the position of said image within said three-dimensional space.

2. The cursor of claim 1, wherein said reference symbol comprises a Greek cross, said pointer symbol comprises a Saint Andrew's cross, and said tether symbol comprises a line.

3. The cursor of claim 1, wherein said one or more depth cue features comprise in a stereoscopic system binocular disparity exhibited between two two-dimensional perspective projections of said cursor which are fused by the observer to form a single three-dimensional image of said cursor.

4. The cursor of claim 3, wherein said reference symbol comprises a Greek cross, said pointer symbol comprises a Saint Andrew's cross, and said tether symbol comprises a line connecting the center points of said Greek cross and said Saint Andrew's cross.

5. The cursor of claim 3, wherein said reference plane is coincident with a stereoscopic plane having zero binocular disparity.

6. A process for producing a cursor for use in a stereoscopic imaging system in which left and right perspective projections corresponding to information in a three-dimensional information database are used to provide two-dimensional images having depth qualities, which process includes the steps of:
  selecting in said database a particular position for indication;
  generating within said database cursor data corresponding to a reference symbol on a stereoscopic plane having zero binocular disparity established by said perspective projections, a pointer symbol pointing to said particular position, and a tether symbol connecting said reference symbol and said pointer symbol;
  converting said cursor data to form left view cursor data corresponding to a two-dimensional left perspective projection of said cursor in said stereoscopic system;
  converting said cursor data to form right view cursor data corresponding to a two-dimensional right perspective projection of said cursor in said tereoscopic system; and
  displaying images corresponding to said light and left view cursor data on said stereoscopic imaging system.

7. The process of claim 6, wherein said step of displaying image includes the steps of:
  alternately producing images corresponding to said left and right view cursor data on the screen of a cathode-ray tube;
  alternately encoding the images corresponding to said left and right view cursor data in light of respective first and second polarization senses through the use of a variable optical retarder and a polarizing filter; and
  separately decoding the images corresponding to said left and right view cursor data for separate perception by the left and right eyes of an observer through the use of first and second viewing means, said first viewing means having first polarization-sensitive means for transmitting light of said first polarization sense and blocking light of said second polarization sense, said second viewing means having second polarization-sensitive means for transmitting light of said second polarization sense and blocking light of said first polarization sense.

8. A cursor image for indicating position in a stereoscopic imaging system in which left and right perspective projection are used to provide images having three-dimensional qualities, comprising:
  a reference symbol located at a reference point, a pointer symbol located at a particular position being indicated, and a tether symbol connecting said reference and pointer symbols,
  said cursor image produced by the process including the steps of:
    generating within a three-dimensional information database cursor data corresponding to said reference symbol, said pointer symbol, and said tether symbol;
    converting said cursor data to form left view cursor data corresponding to a two-dimensional left perspective projection of said cursor in said stereoscopic system;
    converting said cursor data to form right view cursor data corresponding to a two-dimensional right perspective projection of said cursor in said stereoscopic system; and
    displaying images corresponding to said right and left view cursor data on said stereoscopic imaging system.

9. The process of claim 8, wherein said step of displaying images includes the steps of:
  alternately producing images corresponding to said left and right view cursor data on the screen of a cathode ray tube;
  alternately encoding the images corresponding to said left and right view cursor data in light of different first and second polarization senses through the use of a variable optical retarder and a polarizing filter; and
  separately decoding the images corresponding to said left and right view data for separate perception by the left and right eyes of an observer through the use of first and second viewing means each having differently configured polarization-sensitive means for transmitting light of one polarization sense and for blocking light of the other polarization sense.

10. The cursor of claim 1, wherein each of said reference and pointer symbols has a center and in which said tether symbol connects said centers of said reference and pointer symbols.

11. The cursor of claim 10, wherein said tether symbol comprises a line.

12. The cursor of claim 11, wherein said line is straight.

13. In a stereoscopic imaging system having a displaying device on which first and second views of a scene are formed to provide a representation of three-dimensional space, an apparatus for indicating a particular position within the three-dimensional space, comprising:
  means for designating within said three-dimensional space a reference plane with a reference point;
  means for rendering a reference symbol corresponding to said reference point;
  means for rendering first and second views of a pointer symbol that points to said particular location; and
  means for rendering first and second views of a tither symbol that connects said reference symbol and said pointer symbol, thereby to form a cursor that indicates said particular position within said three-dimensional space.

14. The apparatus of claim 13, further comprising means for forming said first and second views with binocular disparity between them, and wherein said three-dimensional space includes a zero disparity plane said reference plane corresponds to said zero disparity plane.

15. The apparatus of claim 13, wherein said tether symbol comprises a line.

16. The apparatus of claim 13, wherein said first view of said tether symbol connects said reference symbol and said first view of said pointer symbol, and said second view of said tether symbol connects said reference symbol and said second view of said pointer symbol.

* * * * *

UNITED STATES PATENT AND TRADEMARK OFFICE
CERTIFICATE OF CORRECTION

PATENT NO. : 4,808,979
DATED : February 28, 1989
INVENTOR(S) : Richard J. DeHoff and Peter W. Hildebrandt It is certified that error appears in the above—identified patent and that said Letters Patent is hereby corrected as shown below:

Col. 8, line 65 reads "due" should read --cue--.

Signed and Sealed this

Twenty-eighth Day of November 1989

Attest:

JEFFREY M. SAMUELS

Attesting Officer     Acting Commissioner of Patents and Trademarks